United States Patent [19]

Mason

[11] 4,216,482
[45] Aug. 5, 1980

[54] AUTOMATIC PAPER ALIGNMENT MECHANISM

[75] Inventor: Martin K. Mason, West Newbury, Mass.

[73] Assignee: Hewlett-Packard Company, Palo Alto, Calif.

[21] Appl. No.: 228

[22] Filed: Jan. 2, 1979

[51] Int. Cl.[2] ............................................. G01D 15/28
[52] U.S. Cl. ................... 346/129; 271/227; 271/246; 346/134
[58] Field of Search ............... 346/134, 129; 271/246, 271/227; 226/15, 17

[56] References Cited

U.S. PATENT DOCUMENTS

| 3,360,262 | 12/1967 | Kekopoulos | 271/227 |
| 3,637,203 | 1/1972 | French | 271/246 |
| 3,761,950 | 9/1973 | Yeiser | 346/129 X |

Primary Examiner—Joseph W. Hartary
Attorney, Agent, or Firm—Donald N. Timbie

[57] ABSTRACT

A paper alignment mechanism for a recorder in which the paper is moved by one or both rollers at the outer edges of the paper along the X axis in accordance with one variable and a stylus is moved across the paper along the Y axis in accordance with another variable, the alignment being achieved by determining the distance between two points on a line parallel to the Y axis and an orientation line on the paper, applying a pivot near one edge of the paper and a force near the other edge, the force being in such direction as to rotate the paper to an aligned position and the relative positions between the pivot and the point of application of the force being such that the paper between them is in tension.

8 Claims, 13 Drawing Figures

AUTOMATIC PAPER ALIGNMENT MECHANISM

BACKGROUND OF THE INVENTION

In moving paper XY recorders, a sheet of material, typically having a grid imprinted thereon, is moved in an X direction in accordance with one variable, such as time, and a stylus is moved across the material in the orthogonal Y direction in accordance with the other variable. Alignment of the grid with the XY axes of the recorder is essential if accurate readings of the plots are to be made. One way to do this is to align the grid with perforations along the edge of the material and move it with a sprocket wheel. Whereas this works in a satisfactory manner, it requires more expensive special paper that is not generally available. Another way of aligning the material is to provide a paper guide bar that is parallel to the X axis along which the paper moves, a stop that is parallel to the Y axis, and a continuously driven rubber friction roller oriented so as to drive the paper into the corner formed by the guide bar and the stop. Means are provided for sensing when the paper has settled into the corner, raising the stop, and causing drive rollers to engage the paper and move it forward into the machine. This approach requires a number of separate rather cumbersome mechanisms and, if the paper is very thin, as much grid paper is, it may buckle when it strikes the guide bar or the stop so that it will become misaligned when they are removed. Furthermore, the friction roller can only drive the paper into the corner so that it cannot compensate for any side force exerted by the operator or obstruction that would cause it to be too close to the guide bar.

BRIEF DESCRIPTION OF THE INVENTION

A moving paper XY recorder is generally comprised of drive means for applying forces to a sheet of paper so as to move it in the X direction along a platen and means for moving a carriage bearing a stylus across the paper in the Y direction. This description will apply to mechanisms having X drive members only at the edges of the sheet. In accordance with the invention, means are provided for determining the skew of the paper by detecting the lack of parallelism of the recorder axes with any linear feature of the paper, or printing oriented to the paper axes by detecting two points on this feature. Other means are provided for applying a pivot to the paper and causing one of the drive means to rotate the paper about the pivot so as to correct the skew. In order to avoid buckling the paper, it is important that the relative location of the pivot and the drive means be such that the paper between them is in tension. An edge of the paper or a line printed on it can serve as the linear feature or orientation line in the preferred form of the invention, and the length of the paper, as well as its squareness, can also be determined. Other forms of the invention may be limited to using the front edge as a reference. It is also possible to use a drive means as a pivot.

PREFERRED EMBODIMENT

In the type of recorder that can be adapted so as to incorporate this invention, the graph paper on which the recording is made is moved along the X axis of the recorder in accordance with one variable, and a stylus is moved across the paper along the Y axis in accordance with another variable. Various means may be used to perform these functions but, in the particular recorder illustrated in FIGS. 1, 1A and 1B, a sheet of paper P is moved along the surface of a platen 2 by forces applied parallel to the X axis of the platen 2 by drive rollers 4 and 6 located on opposite sides of the platen. The drive rollers 4 and 6 are under the platen 2 and extend into openings 8 and 10 so as to respectively touch a pinch roller 12, when it is properly positioned in a manner to be described, and a pinch roller 14 in the plane of the upper surface of the platen 2.

Figures 1, 1A, 1B:
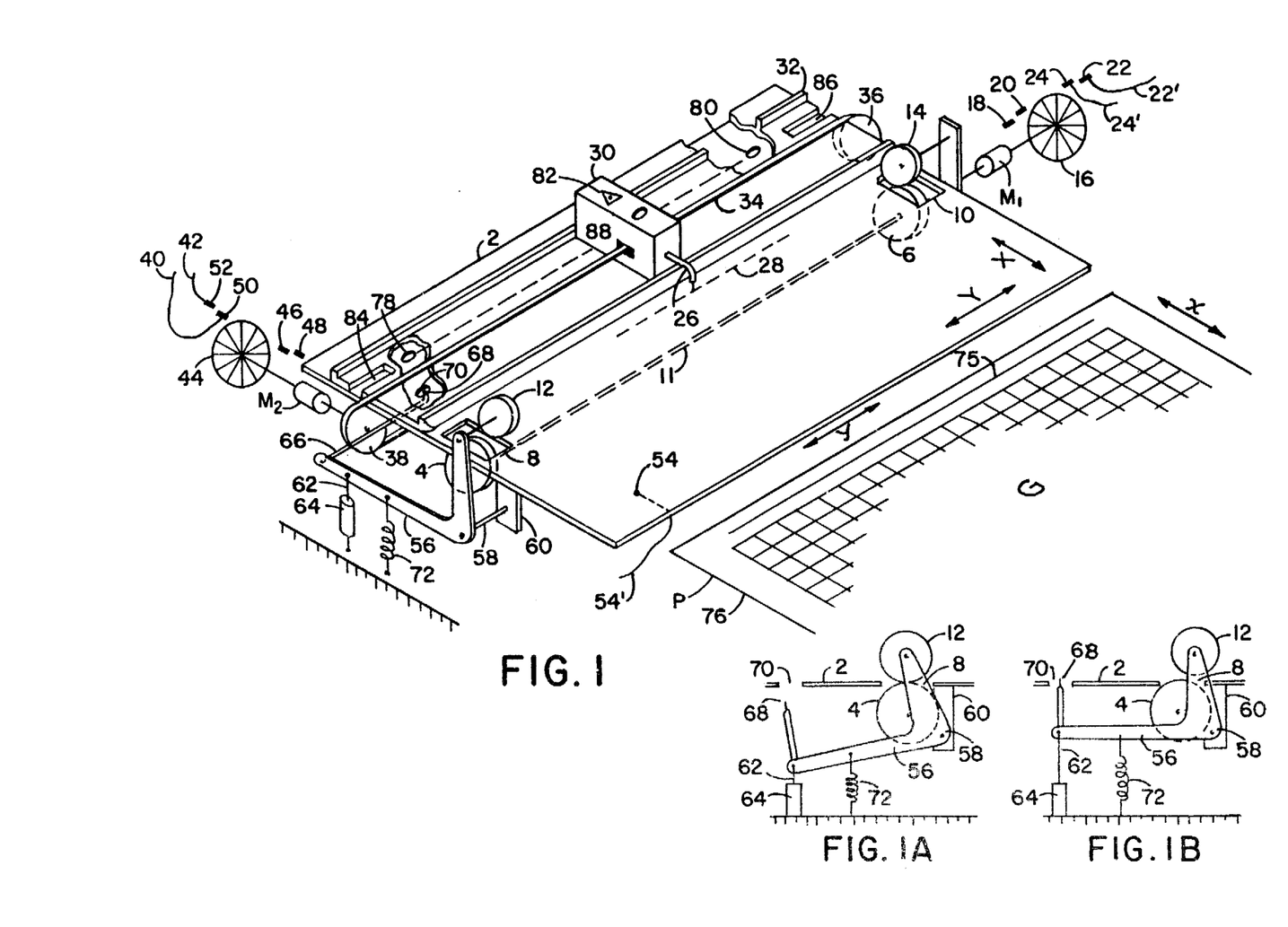
FIG. 1 is an exploded isometric view of a preferred embodiment of the invention.
FIGS. 1A and 1B are partial side views of a portion of the structure of FIG. 1 that show different operating positions of the mechanism.

The drive rollers 4 and 6 are affixed to the shaft 11 of a motor $M_1$ and indication as to the number and direction of angular increments through which the motor $M_1$ rotates can be attained from electrical pulses produced as radial lines on a transparent disc 16 that is mounted on the axle intercept beams of light passing from sources 18 and 20 through the disc 16 to photodetectors 22 and 24 respectively. The points at which the beams of light pass through the disc 16 are displaced by one-quarter of the angular spacing between the radial lines, and the electrical pulses appear on leads 22' and 24'.

A stylus 26 is moved across the platen 2 along a line 28 that is parallel to the Y axis of the recorder by affixing it to a carriage 30 that is mounted for movement along a channel 32 which is aligned with the Y axis of the recorder. The carriage 30 is moved by attaching it to a belt 34 that is entrained over an idler pulley 36 and a drive pulley 38 so as to extend around the platen 2.

The drive pulley 38 is affixed to the axle of a motor $M_2$, and indication as to the amount and direction of the rotation of the motor $M_2$ may be derived from pulses produced on leads 40 and 42 by a disc 44, light sources 46 and 48, and photodetectors 50 and 52 that operate as the corresponding components discussed in connection with the motor $M_1$. The channel 32 is assembled with its bottom surface closely spaced from the top surface of the platen 2. A photodetector 54 is imbedded in the upper surface of the platen 2 at a point behind the opening 8 for the purpose of indicating on a lead 54' when paper is being fed to the recorder.

In accordance with the invention, means such as described below are provided for reciprocally applying force to one side of the paper at the intersection of one set of X, Y coordinates and providing a pivot about which the paper can be rotated at a different set of X, Y coordinates. Whereas the pinch roller 14 in FIG. 1 is maintained in contact with the drive roller 6, the axle of the pinch roller 12 is secured to one end of a V-shaped lever 56 that rotates about an axle 58 at its apex. The axle 58 is secured to a projection 60 that extends below the platen 2. The other end of the lever 56 is attached to a rod 62 of a solenoid 64, and an arm 66 projects perpendicularly from that end of the lever 56 under the platen 2. A vertical pin 68 is mounted at its end so as to be in registry with an opening 70 in the platen 2, and a tension spring 72 is attached to the lever 56 at a point between the axle 58 and the point where the solenoid rod 62 is attached so as to bias the lever 56 in a counterclockwise position. The relationship between these components is more clearly shown in FIGS. 1A and 1B which are enlargements of portions of a side view of FIG. 1 along the direction of an arrow 74. As shown in FIG. 1A, when the lever 56 is pulled into a counterclockwise position by the tension spring 72, the pin 68 is below the top surface of the platen 2 and the pinch roller 12 is in contact with the drive roller 4 in the plane of the upper surface of the platen 2. When the solenoid 64 is energized, the lever 56 is rotated clockwise to a position shown in FIG. 1B so that the pin 68 extends through the opening 70 and to the bottom surface of the channel 32. If the pin 68 is placed in the position shown in FIG. 1B before the paper P reaches it, the pin acts as a stop; but if this occurs when the paper P is between the pin and the bottom surface of the channel 32, the pin acts as a pivot so that force applied to the paper by the drive roller 6 and the pinch roller 14 will cause the paper to rotate about the pin in a direction determined by the direction of the force.

It is also required that means be provided for detecting the presence of an orientation line of the paper P at two points so that the amount by which the x, y coordinates of the grid G on the paper are skewed with respect to the X, Y coordinates of the recorder can be ascertained. The orientation line can be any edge of the paper P, a printed line 75 that is parallel to the y coordinates of the grid G, or a printed line 76 that is parallel to the x coordinates of the grid G.

In the particular embodiment shown in FIG. 1, reflectors 78 and 80, as seen through the cutaway sections in the bottom of the channel 32, are imbedded on a line that is parallel to the Y axis in the upper surface of the platen 2, and a photodetector 82 is mounted in the carriage 30. The photodetector 82 projects a beam of light in a downward direction that is focussed at the upper surface of of the platen 2, but it can only reach the platen when the carriage 30 is positioned with the photodetector 82 in registration with one of the apertures in the bottom of the channel 32 that are in registration with the reflectors 78 and 80. These apertures are not shown because of the cutaway sections. The light can also reach the platen 2 through slots 84 and 86 at either end of the channel 32. In order to aid in manual operation, a light 88 may be provided on the carrier 30 that is lit whenever the photodetector 82 is receiving reflected light, or vice-versa.

Means other than the photodetector 82 may be used for detecting a change in optical characteristics at points on the platen 2. The detector 82 could, for example, be replaced by a simple light source, in which case the reflectors 78 and 80 would be light detectors, but this would make it impossible to detect changes in optical characteristics produced by anything other than the front edge of the paper P. By making the reflectivity of the upper surface of the platen 2 approximately the same or greater than that of the paper P, the reflectors 78 and 80 can be eliminated and the line 75 or the line 76 printed on the paper can be used as an orientation line so that the correction of the skew of the paper can be referenced to either of them. It would also be possible to eliminate the reflectors 78 and 80 if the reflectivity of the upper surface of the platen 2 were made substantially less or greater than that of the paper, in which case the edges of the paper P would be the orientation line and the correction of skew would be referenced to them.

CONTROL CIRCUITS

Figure 2:
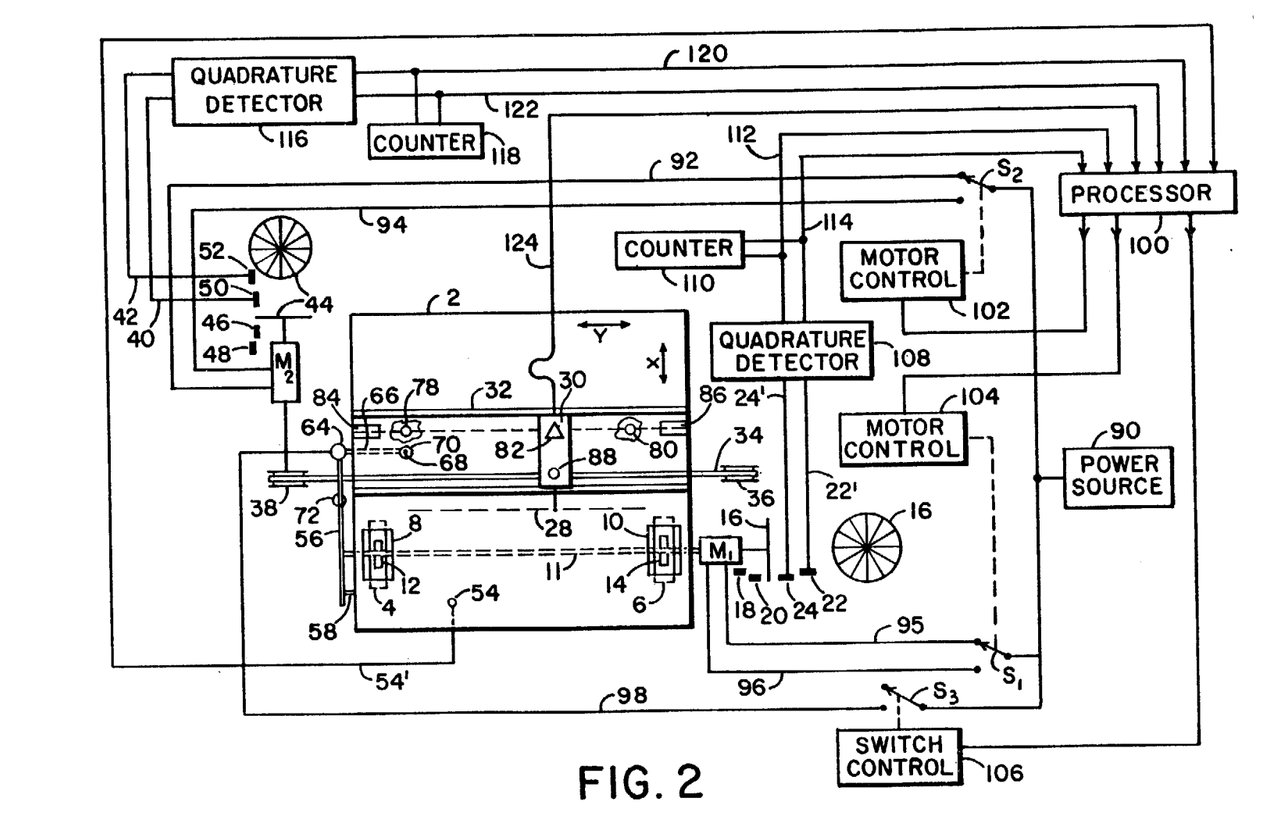
FIG. 2 is a schematic diagram illustrating the manner in which the preferred embodiment of FIG. 1 may be operated manually as well as by processor control.

In FIG. 2, the manner in which the apparatus of FIG. 1 may be controlled manually, as well as by a programmed processor, is schematically illustrated. In the less detailed drawing of the apparatus of FIG. 1 set forth therein, the components are indicated by the same numerals, and the channel 32 is not shown in the interest of clarity.

Electrical power from a source 90 is applied to the arms of switches $S_1$, $S_2$ and $S_3$. With $S_2$ in the position shown, wherein it is in contact with a lead 92, power is applied to a winding of the motor $M_2$ which causes it to rotate in such direction as to move the carriage 30 to the right; and with $S_1$ in its other position, wherein it is in contact with a lead 94, the motor $M_2$ rotates in the opposite direction so as to move the carriage 30 to the left. With the switch $S_1$ in the position shown, wherein it is in contact with a lead 95, power is applied to the winding of the motor $M_1$ which causes it to rotate in such direction as to make the tops of the drive rollers 4 and 6 move in a forward direction, i.e., toward the top of the drawing; and with the switch $S_1$ in its other position, wherein it is in contact with a lead 96, the motor $M_1$ rotates in the opposite direction so that the tops of the drive rollers 4 and 6 move backward, i.e., toward the bottom of the drawing. When the switch $S_3$ is open, as shown, the solenoid 64 is not energized so that the tension spring 72 rotates the lever 56 into the position shown in FIG. 1A; but when the switch $S_3$ is closed, power is supplied to the solenoid 64 via a lead 98 so as to rotate the lever 56 to the position shown in FIG. 1B.

When the apparatus is controlled manually, the switches $S_1$, $S_2$ and $S_3$ are operated by hand, but when the apparatus is to be controlled by a processor 100, it operates the switches by means of motor controllers 102 and 104 and a switch controller 106. Signals indicative of the angular increments and direction through which the motor $M_1$ turns as it moves the paper along the X axis are derived from the pulses on the leads 22' and 24' by a quadrature detector 108 and are supplied to a counter 110 as well as to the processor 100 via leads 112 and 114. Signals indicative of the angular increments and direction through which the motor $M_2$ turns in moving the carriage 30 are derived from the pulses on the leads 40 and 42 by a quadrature detector 116 and are supplied to a counter 118 and to the processor 100 by leads 120 and 122. A signal indicating that the detector 82 is over one of the reflectors 78 or 80 is supplied to the processor via the lead 124; and a signal to the effect that the paper is over the detector 54 is supplied to the processor via the lead 54'. Outputs of the processor 100 go to the motor controllers 102 and 104 and the switch controller 106.

Figure 3:
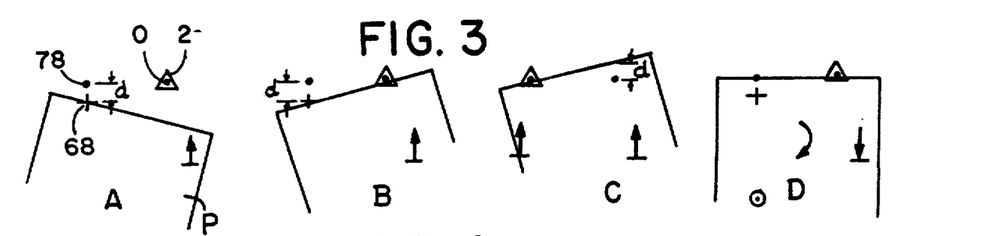
FIG. 3 is a series of diagrams used in explaining the operation of the preferred embodiment when the sheet of paper enters the recorder with a clockwise skew.
Figure 4:
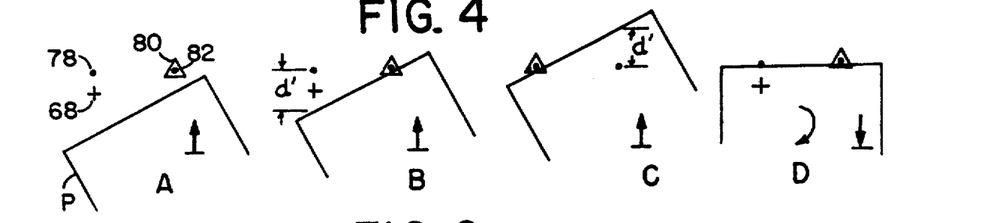
FIG. 4 is a series of diagrams used in explaining the operation of the preferred embodiment of FIG. 1 when the sheet of paper enters the recorder with a counter-clockwise skew.

Whether the operation of the embodiment of FIG. 1 is controlled manually or by the processor 100, the paper P will be moved as illustrated by the views A, B, C, and D of FIGS. 3 and 4. In the interest of clarity, mechanical details and numerals are omitted in this as well as all other figures of the drawing illustrating the movements of the paper. The reflectors 78 and 80 are indicated by dots, and the position of the detector 82 is shown by a small triangle, but the numerals are only shown in the view A. The pin 68 is shown by a "+" whenever it is above the top surface of the platen 2. When a pinch roller is engaged with its drive roller, the direction of the force applied to the paper is indicated by an arrow, and the horizontal line at one end of the arrow indicates the point where the force is applied, i.e., where the pinch roller and its drive roller meet. In order that the movement of the paper P can be more clearly illustrated, its skew and the distances between the pin 68 and the line on which the reflectors 78 and 80 are located have been greatly exaggerated.

MANUAL OPERATION

Before inserting the paper, the pin 68 is thrust above the surface of the platen 2 and the detector 82 is moved over the right reflector 80. If the paper P is initially inserted with a clockwise skew it will strike the pin 68 and will be rotated counterclockwise about the pin by the force exerted between the drive roller 6 and the pinch roller 14. When the front edge of the paper reaches the reflector 80, as in the view B, the light 88 goes out, and forward motion of the paper is stopped. Then the detector 82 is moved over the left reflector 78, the pin 68 is lowered below the platen 2, and both drive rollers advance the paper until its forward edge is over the left reflector 78, as indicated by the light 88 going out. This is indicated in the view C. Once again, the pin is raised and the detector 82 is moved over the right reflector 80. The pin now acts as a pivot by pinning the paper against the bottom of the channel 32, and the motor $M_1$ is energized so as to rotate the paper in a clockwise direction. When the light 88 comes on, the rotation is stopped and the paper is aligned as shown in the view D.

The counter 110 may be used to aid in determining when the paper has been rotated to the aligned position of the view D by noting its count when the paper is in the position of the view B and driving the paper backward with the drive roller 6 until the same count is restored.

When the initial skew of the paper is clockwise as shown in FIG. 1, the distance through which the right side is driven backward so as to move it from the position of the view C to that of the view D is always the same, namely, the distance d between the pin 68 and the line on which the reflectors 78 and 80 are mounted. If, however, the initial skew is counterclockwise, as in the view A of FIG. 4, the sequence of operation is the same, but the distance d' through which the right side is driven backward so as to move it from the position of the view C to that of the view D will vary and will be greater than d. The distance d' is the distance along the X axis between the left reflector 78 and the front edge of the paper when it is in the position shown in the view B.

It is important that the relationship between the location of the pin 68 and the point of application of the force is such as to place the paper between them in tension when the aligning operation is performed so as to avoid buckling and the alignment error that would result. By way of example, if the pin 68 were located at a position such as indicated by O in the view D of FIG. 3, the paper would be rotated clockwise as required, but the portion of the paper between the point O and the point of application of the force would be in compression so that it would buckle.

PROCESSOR CONTROL

Figure 5:
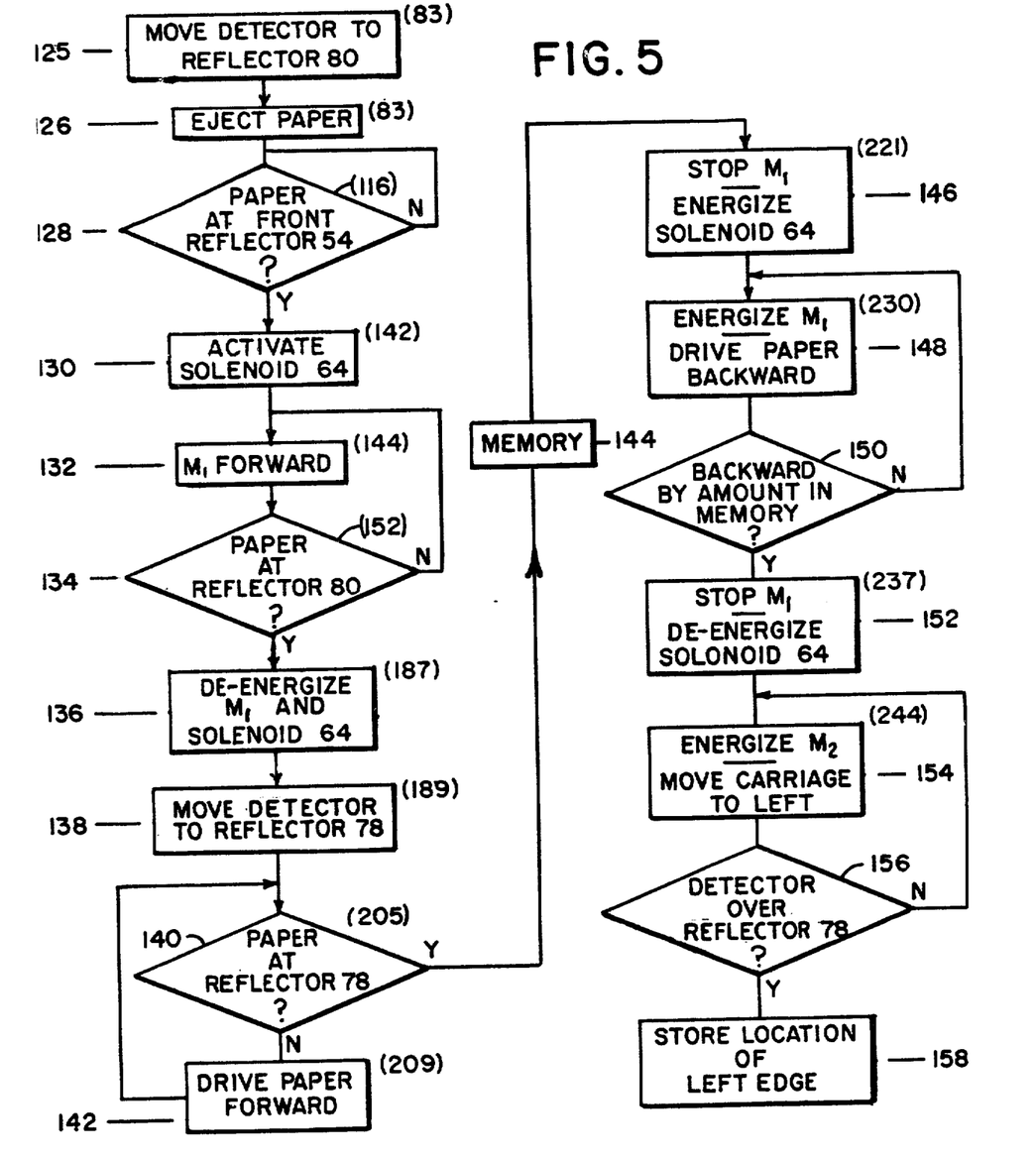
FIG. 5 is a flow chart for the program set forth at the end of the specification.

A program for the processor 100, which is identified as Motorola 6800, is set forth at the end of the specification, but the flow chart therefor, which corresponds to the steps of manual operation just described, is shown in FIG. 5. The numerals in parentheses beside the various blocks on the flow chart indicate the number of a related step in the program. The motors $M_1$ and $M_2$ are rotated by one angular increment at a time and the results are monitored until the desired position of the carriage 30 or of the paper P is attained. In block 125, the carriage 30 is moved to the right until the detector 82 is in registration with the reflector 80. If any paper is present, it is ejected as indicated in block 126.

Paper is then inserted by the operator. When it reaches the detector 54, as determined in the decision block 128, the solenoid 64 is activated, block 130, so as to move the pin 68 to the position indicated in FIG. 1B where it acts as a stop. The motor $M_1$ is also activated so as to drive the paper forward, as indicated in block 132. The motor $M_1$ keeps driving until, as indicated in a decision block 134, the paper P reaches the right-hand reflector 80. At this point, block 136, the motor $M_1$ and the solenoid 64 are de-energized so as to stop the motion of the paper and permit the pin 68 to be returned to its normal position by the spring 72. At this time, as indicated by a block 138, the carriage 30 is moved to the left until the detector 82 is over the reflector 78. A test is made, decision block 140, as to whether the paper has reached the reflector 78. Until it does, the motor $M_1$ is energized so as to drive the paper forward, block 142. When the paper reaches the reflector 78, the amount it has moved is stored in a memory block 144, the motor $M_1$ is stopped, and the solenoid 64 is energized, block 146, so that the pin 68 moves upward and pins the paper against the undersurface of the channel 32. The motor $M_1$ is then reactivated, block 148, so that the force applied to the paper by the drive roller 6 and the pinch roller 14 is backward, i.e., in a direction to drive the paper back out of the machine. When the paper has been moved in this direction by the same amount as stored in the memory block 144, decision block 150, the motor $M_1$ is stopped and the solenoid 64 is de-energized, block 152, so that the pin 68 is withdrawn and the pinch roller 12 is in contact with the drive roller 4, as indicated in FIG. 1A. At this point, the paper is aligned by reference to its front edge.

LEFT-TO-RIGHT POSITIONING

Before proceeding to record, however, it is desirable to determine the left-to-right position of the paper, and therefore the left-to-right position of the grid G so as to be able to place the zero value of the variable in the Y direction on a desired grid line in the X direction. Otherwise, although aligned, the zero value of the recording might lie between two adjacent grid lines or at the wrong grid line. This is easily accomplished by moving the carriage 30 to the left, block 154, until the detector 82 is over the left reflector 78, as indicated in the block 156, and then farther to the left so that its focussed beam reaches the platen 2 through the slot 84. The reflectivity of the surface of the platen 2 is made different from the reflectivity of the paper so that the signal produced by the detector 82 changes when the detector reaches the left edge of the paper. The number of increments through which the motor $M_2$ rotates in this process is stored, as indicated in block 158, and can be used by means not shown in determining the position of the Y plot. Measurements can be made, of course, from either reflector 78 or 80 to either side of the paper.

CHECKING SQUARENESS

Figure 6:
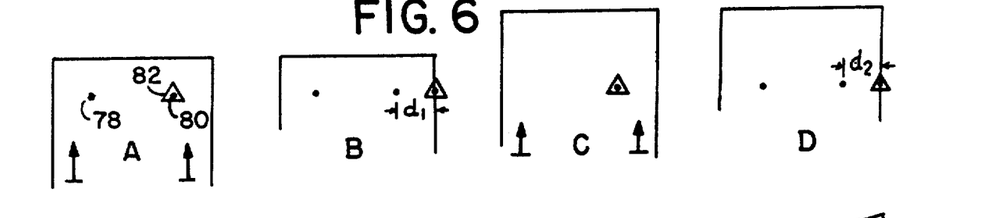
FIG. 6 is a series of diagrams showing how the preferred embodiment can be used to check the squareness of the paper.

FIG. 6 illustrates how the squareness of the paper can be checked with the apparatus of FIG. 1, whether it is controlled manually or by a processor. After the paper has attained the position shown in view D of FIG. 3, it is advanced by both drive rollers 4 and 6 as shown in view A of FIG. 6, with the detector 82 still over the reflector 80. The detector 82 is then moved to the right so that its beam of light passes through the slot 86. If the reflectivity of the platen is greater than that of the paper, the light 88 will turn on just after the edge of the paper is reached. The distance $d_1$ through which the detector 82 is moved can be measured by the counter 118 or by the processor 100. The detector 82 is then moved to the left by the distance $d_1$ that was just measured and the paper is advanced for a substantial portion of its length by both drive rollers 4 and 6, as indicated in the view C. The detector 82 is again moved to the right until it reaches the edge so that the distance $d_2$ is measured. If the paper is square, $d_1$ should equal $d_2$.

ALIGNMENT WITH REFERENCE TO SIDE EDGE

Figure 7:
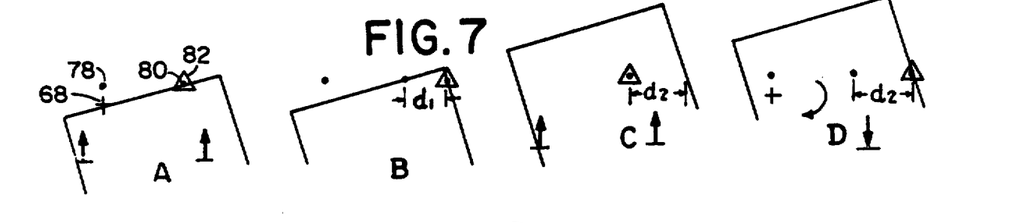
FIG. 7 is a series of diagrams showing how the preferred embodiment can be used to align a sheet of paper with reference to the right edge thereof.

If the squareness of the paper or the orientation of the grid G are in question such that it is desirable to align the paper with reference to a side edge, this can be done as indicated by the views of FIG. 7 wherein it is assumed that the paper enters with a counterclockwise skew and that the reflectivity of the paper is different from that of the platen 2. As in FIG. 1, the paper is driven forward by the rollers 4 and 6 and pivots about the pin 68 until the front edge reaches the right reflector 80, as shown in view A. At this point, the distance $d_1$ to the right edge is measured, as indicated in view B, by moving the carriage 30 until the focussed beam of light passing through the slot 86 reaches that edge. This is indicated by the light 88. This measurement is stored if control is exercised by a processor, or the change in the reading of the counter 118 is noted if the control is manual. The paper is then advanced by both drive rollers 4 and 6 for a greater portion of its length and the detector 82 is placed over the right reflector 80 by moving it to the left by a distance $d_1$, as shown in view C. The detector 82 is then moved to the right through the distance $d_2$ to the right-hand edge, as shown in the view D. The measurement of $d_2$ is stored or noted as in the case of $d_1$. Then, as also shown in the view D, the pin 68 is raised so as to provide a pivot at the left side of the paper and the motor $M_1$ is rotated so that the force applied to the right side of the paper by the roller 6 and the pinch roller 14 is backward. This rotates the paper in a clockwise direction just as described in connection with view D of FIG. 3. The amount by which the right-hand side of the paper is moved backward is determined from the values of $d_1$ and $d_2$, the distance through which the paper was advanced in view C, and the location of the pin 68. Should the paper enter with a clockwise skew, the same procedure would be followed.

ALTERNATIVE EMBODIMENT #1

In the preferred embodiment of the invention shown in FIG. 1, there is only one pivot point, the pin 68, so that rotation into an aligned position can only be in a clockwise direction if the paper is to be under tension as is required to avoid buckling. Therefore, in the embodiment of FIG. 1, if the entering paper already has a clockwise skew, as shown in FIG. 3, it is made to have a counterclockwise skew by pivoting it about the pin 68 prior to being aligned.

Figure 8:
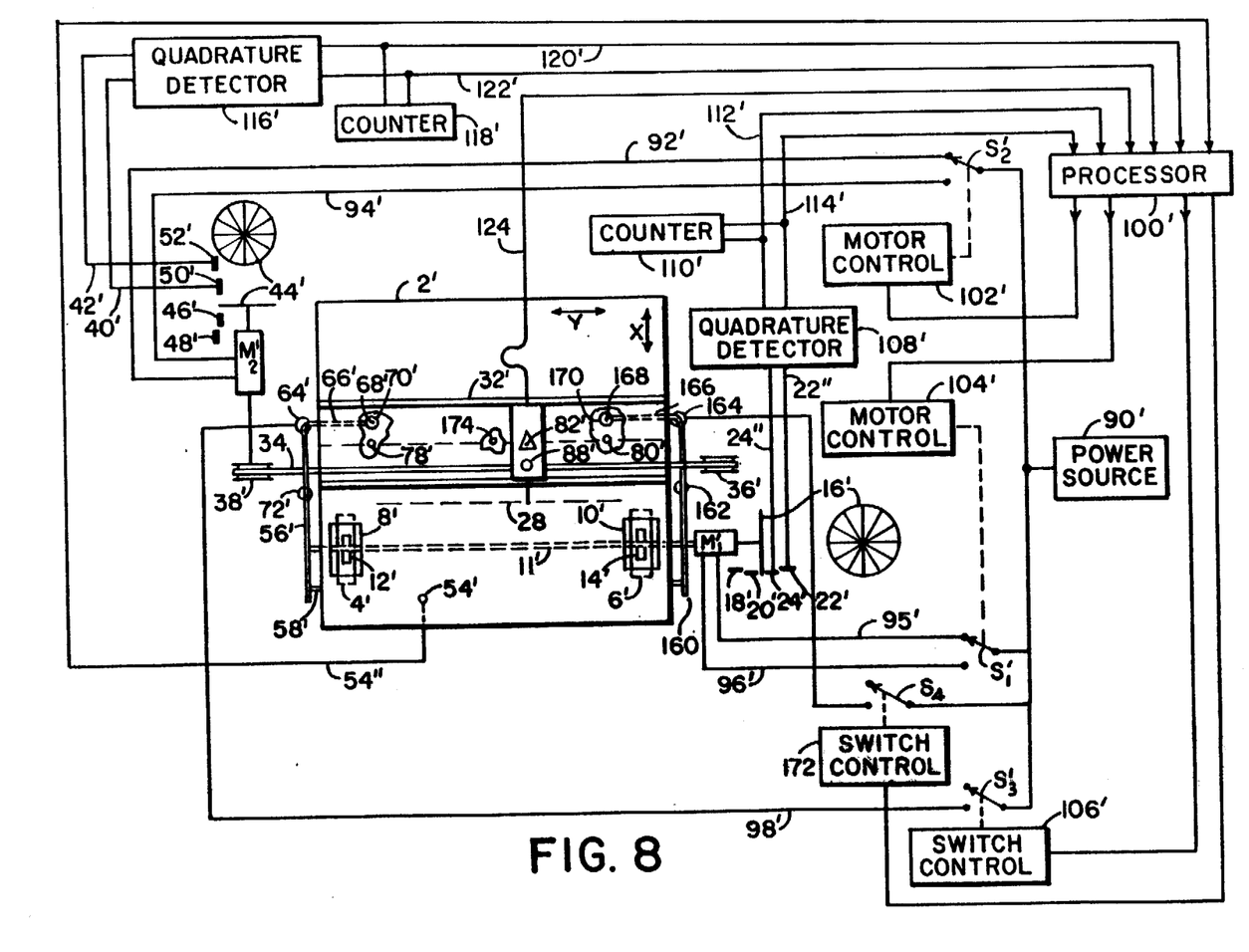
FIG. 8 is a schematic illustration of an alternative embodiment of the invention having separately controllable drive means and pivots on opposite sides of the platen.

In the alignment mechanism of FIG. 8, the paper can be rotated in either direction to attain alignment and still maintain the paper under tension. Those components in FIG. 8 that correspond to components of FIGS. 1 and 2 are indicated by the same numerals primed. The lever 56' on which the pinch roller 12' is mounted differs from the lever 56 in that it is longer so as to place the pin 68' forward of the line on which the reflectors 78' and 80' are located, rather than behind it as in FIG. 1. Instead of being in continuous contact with its drive roller 6', the pinch roller 14' is mounted at one end of a V-shaped lever 160 that is controlled by a tension spring 162 and a solenoid 164 that correspond in function to the lever 56, the spring 72 and the solenoid 64 of FIG. 1. An arm 166 at the end of the lever 160 extends under the platen 2', and a pin 168 at the end of the arm is aligned with a hole 170 in the platen 2'. Power from the power source 90' is applied to the solenoid 164 via a switch $S_4$ that can be controlled manually or by a switch control means 172 which is in turn controlled by signals from the processor 100'. A third reflector 174 is located on the line in the middle of the platen 2' and in line with the reflectors 78' and 80'. The reflectors are viewed through cut-away sections in the bottom of the channel 32'.

Figure 9:
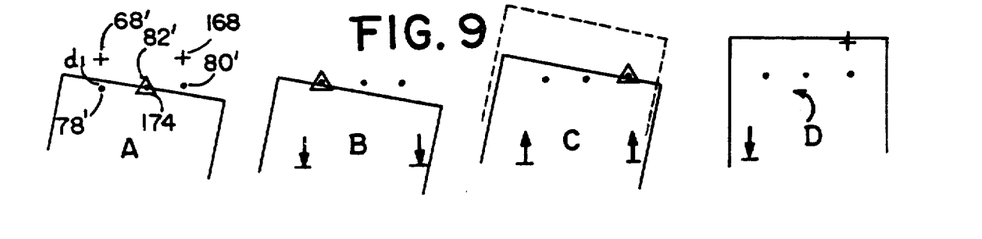
FIG. 9 is a series of diagrams illustrating the operation of the embodiment of the invention shown in FIG. 8.

One method of operating the alignment mechanism is illustrated by the views of FIG. 9. Initially, the pinch rollers 12' and 14' are lifted from the paper, the pins 68' and 168 extend above the platen 2', the motor $M_1$' is de-energized, and the carriage 30' is moved to a point where the detector 82' is directly over the middle reflector 174. When the front edge of the paper reaches the reflector 174, both pinch rollers 12' and 14' are brought into contact with their respective drive rollers 4' and 6', and the detector 82' is moved to a point over the left reflector 78'. The reflector point 174 is positioned so that the paper will be under both pinch rollers when the front edge of the paper reaches it. The motor $M_1$' is energized so as to drive the paper a small amount forward or backward until the front edge reaches the left reflector 78' as shown in view B. The distance and direction required for this are put into a memory, or if the recorder is manually operated, the count on the counter 118' is noted. With paper having a clockwise skew, as indicated in views A and B of FIG. 9, the distance so detected would be d₁ and would be determined when the paper moves backward. The paper is then advanced by both drive rollers 4' and 6' by an amount necessary to ensure that it will cover the right-hand pin 168, as shown by the dotted lines. At this time, the pin 168 is below the platen 2'. The right-hand solenoid 164 is then activated so as to thrust the pin 168 into the paper, and the motor M₁' is rotated so as to force the left side of the paper backward by a distance 2×d₁ so as to be aligned with the XY axes of the recorder as indicated in view D.

ALTERNATIVE EMBODIMENT #2

Figure 10:
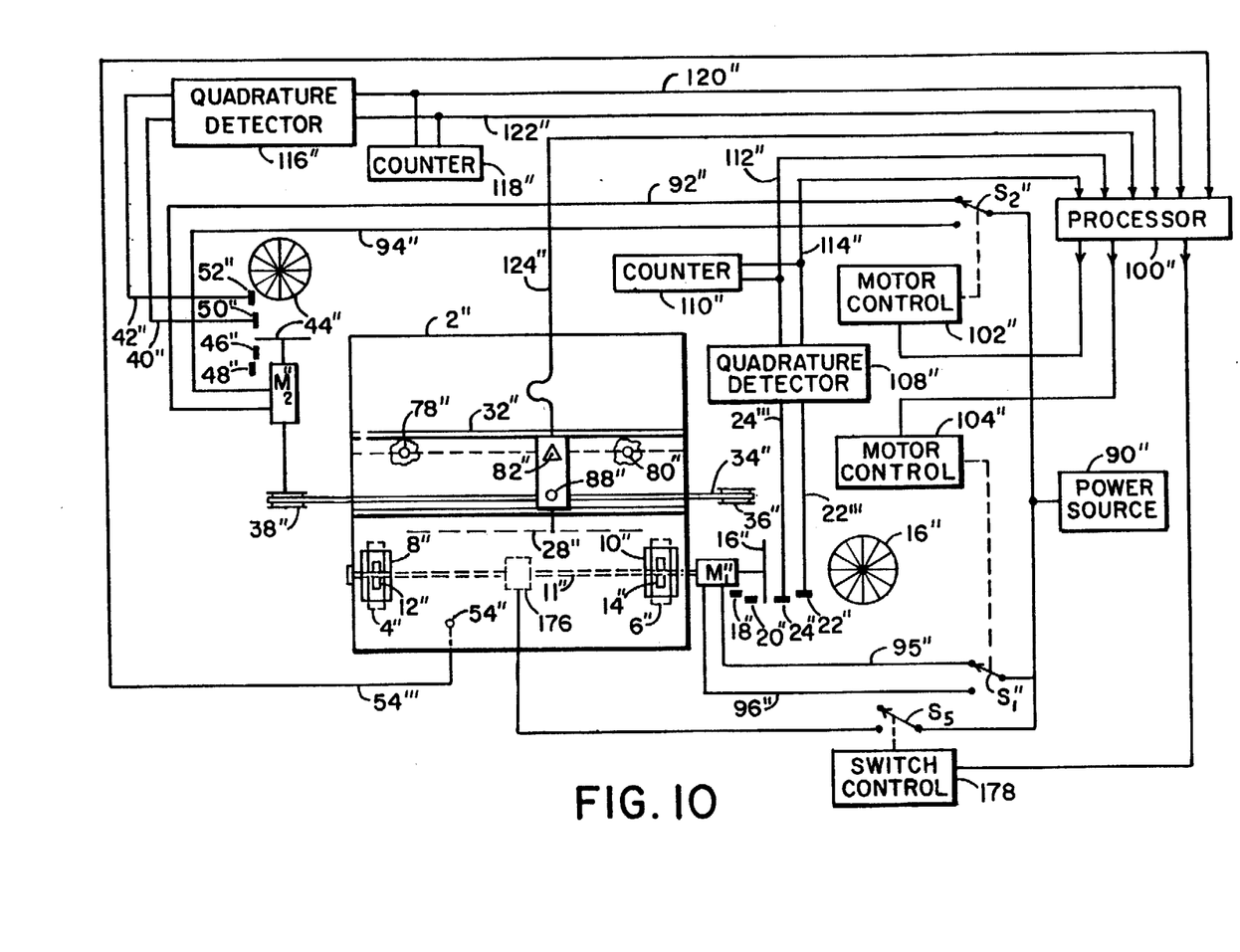
FIG. 10 is a schematic diagram of another alternative embodiment in which the pinch rollers and drive wheels are used as pivots.

FIG. 10 illustrates an alignment mechanism in which the drive and pinch rollers not only drive and rotate the paper, but also act as pivots so that the pin 68 of FIG. 2 can be eliminated. Those components corresponding to components of FIG. 2 are identified by the same numerals with a double prime. The pinch rollers 12" and 14" are mounted like the pinch roller 14 of FIG. 1 so as to always be in contact with drive rollers 4" and 6" respectively, and a controllable clutch-brake 176 is inserted in the shaft 11". Power from the source 90" is conducted to the clutch-brake 176 via a switch S₅ which can be operated by the processor 100" via a switch control 178.

Figure 11:
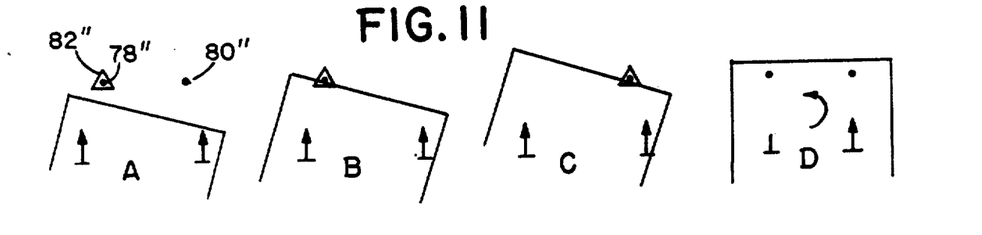
FIG. 11 is a series of diagrams illustrating the operation of the embodiment of the invention shown in FIG. 10.

Operation of the mechanism of FIG. 10 is now explained by reference to the views of FIG. 11. In view A, the clutch-brake 176 is not energized so that both drive rollers 4" and 6" apply a forward force to the paper, and the carriage 30" is moved so that the detector 82" is over one of the reflectors, in this case the left reflector 78". When the front edge of the paper reaches this reflector, as shown in view B, the motor M₁" is stopped and the carriage 30" is moved until the detector 82" is over the right reflector 80". The paper is then advanced until the front edge is over the reflector 80", as shown in view C, and the distance moved is stored or noted in the counter 118". At this point, the clutch-brake 176 is activated so as to lock the pinch roller 12", and a forward force is applied by the pinch roller 14" and drive roller 6" so as to move the right-hand side of the paper forward by the distance just noted into an aligned position, as shown in view D.

Program for the Processor

```
00059  F000                         ORG      $F000
00060              *
00061              *      AUTOMATIC PAPER LOADING ROUTINE
00062              *
00063              *      PIAORB IS USED AS THE INTERFACE WHERE:
00064              *           D0 = CLAMP  OUTPUT = 0 => RELEASE
00065              *                              = 1 => CLAMP
00066              *           D6 = FIXED DETECTOR \ = 0 => NO PAPER
00067              *           D7 = HEAD  DETECTOR  / = 1 => PAPER
00068              *
00069              *      SINCE SH DOUBLE BUFFERS, CHECKING SH PEHUY
00070              *      LINE DOES NOT GUARANTEE THAT A MOVE HAS BEEN
00071              *      EXECUTED.  THUS SOME LARGE MOVES ARE EXECUTED
00072              *      TWICE TO INSURE THEIR COMPLETION BEFORE OTHER
00073              *      MOVES ARE ATTEMPTED.
00074              *
00075              *
00076  F000 36     LOAD    PSH A                    SAVE (A) & (B)
00077  F001 37             PSH B
00078              *
00079  F002 BD F1C1 LOADA  JSR    PENUP             LIFT PEN &
00080  F005 86 B2          LDA A  #$B2              SWITCH TO ABSOLUTE MODE
00081  F007 BD F169        JSR    SHCONT
00082              *
00083  F00A F6 F23A        LDA B  EJECTX            MOVE HEAD TO UPPER WINDOW
00084  F00D B6 F23B        LDA A  EJECTX+1          & EJECT PAPER IF ANY
00085  F010 BD F18B        JSR    SHDAT1
00086  F013 F6 F15F        LDA B  UPWIND
00087  F016 B6 F160        LDA A  UPWIND+1
00088  F019 BD F1A5        JSR    SHDAT2
00089              *
00090  F01C F6 F23A        LDA B  EJECTX            REPEAT MOVE TO INSURE ITS
00091  F01F B6 F23B        LDA A  EJECTX+1          COMPLETION
00092  F022 BD F18B        JSR    SHDAT1
00093  F025 F6 F15F        LDA B  UPWIND
00094  F028 B6 F160        LDA A  UPWIND+1
00095  F02B BD F1A5        JSR    SHDAT2
00096              *
00097  F02E 86 B8          LDA A  #$B8              SWITCH TO RELATIVE MODE
00098  F030 BD F169        JSR    SHCONT
```

```
00099                   *
00100 F033 96 07  LOAD0  LDA A  PAPLED   FLASH PAPER LED
00101 F035 85 40         BIT A  #$40     IS IT TURNED ON?
00102 F037 26 0A         BNE    LOAD1
00103                   *
00104 F039 86 40         LDA A  #$40     NO, TURN IT ON
00105 F03B 97 07         STA A  PAPLED
00106 F03D B7 1002       STA A  LEDLAT
00107 F040 7E F049       JMP    LOAD2
00108                   *
00109 F043 7F 0007 LOAD1 CLR    PAPLED   YES, TURN IT OFF
00110 F046 7F 1002       CLR    LEDLAT
00111                   *
00113                   *
00114 F049 86 FA  LOAD2  LDA A  #250     WAIT FOR 250 MSEC
00115 F04B BD F23C       JSR    PAUSE
00116 F04E B6 1801       LDA A  PIAORB   & READ FIXED DETECTOR
00117 F051 85 40         BIT A  #$40     IS PAPER OVER DETECTOR?
00118 F053 27 DE         BEQ    LOAD0    NO, LOOP UNTIL IT IS
00119                  .*
00120 F055 86 32         LDA A  #50      YES, WAIT 50 MSEC
00121 F057 BD F23C       JSR    PAUSE
00122 F05A B6 1801       LDA A  PIAORB   & CHECK FOR PAPER AGAIN
00123 F05D 85 40         BIT A  #$40     IS PAPER STILL THERE?
00124 F05F 27 D2         BEQ    LOAD0    NO, TRY AGAIN
00125                   *
00126 F061 B6 1801       LDA A  PIAORB   READ HEAD DETECTOR AT
00127 F064 49            ROL A           UPPER WINDOW
00128 F065 24 0F         BCC    LOAD4    IS PAPER OVER DETECTOR?
00129 F067 BD F21B       JSR    EJECT    YES, EJECT IT & REPEAT
00130 F06A BD F21B       JSR    EJECT    TO INSURE EXECUTION
00131                   *
00132 F06D B6 1801 LOAD3 LDA A  PIAORB   IS PAPER STILL THERE?
00133 F070 49            ROL A
00134 F071 24 C0         BCC    LOAD0    NO, TRY TO LOAD AGAIN
00135 F073 7E F159       JMP    LOAD9    YES, PAPER IS JAMMED
00136                   *
00137 F076 7F 1002 LOAD4 CLR    LEDLAT   CLEAR PAPER LED'S
00138 F079 7F 0007       CLR    PAPLED   & INDICATOR
00139 F07C B6 F15E       LDA A  STPLIM   RESET STEP COUNTER
00140 F07F 97 0D         STA A  STPCTR
00141                   *
00142 F081 86 01         LDA A  #$01     TURN ON CLAMP TO BLOCK PAPER
00143 F083 B7 1801       STA A  PIAORB
00144 F086 F6 F163 LOAD5 LDA B  XSTEP1   STEP -.050 IN X DIRECTION
00145 F089 B6 F164       LDA A  XSTEP1+1
00146 F08C BD F18B       JSR    SHDAT1
00147 F08F 4F            CLR A
00148 F090 5F            CLR B
00149 F091 BD F1A5       JSR    SHDAT2
00150 F094 BD F1B8       JSR    SHREDY   WAIT FOR STEP TO OCCUR
00151                   *
00152 F097 B6 1801       LDA A  PIAORB   IS PAPER EDGE OVER HEAD
00153 F09A 49            ROL A           DETECTOR?
00154 F09B 25 29         BCS    LOAD6    YES
00155                   *
00156 F09D 7C 000D       INC    STPCTR   NO, NEED TO RESET X AXIS?
00157 F0A0 26 E4         BNE    LOAD5    NO, CONTINUE STEPPING
00158 F0A2 B6 F15E       LDA A  STPLIM   YES, RESET STEP COUNTER
00159 F0A5 97 0D         STA A  STPCTR
00160                   *
00162                   *
00163 F0A7 86 B0         LDA A  #$B0     SWITCH TO ABSOLUTE MODE &
00164 F0A9 BD F169       JSR    SHCONT
00165 F0AC F6 F23A       LDA B  EJECTX   REDEFINE X AXIS AS EJECT
00166 F0AF B6 F23B       LDA A  EJECTX+1 VALUE TO PREVENT OVERFLOW
00167 F0B2 BD F1A5       JSR    SHDAT2
```

```
00168 F0B5 F6 F15F       LDA B    UPWIND
00169 F0B8 B6 F160       LDA A    UPWIND+1
00170 F0BB BD F1A5       JSR      SHDAT2
00171 F0BE 86 B8         LDA A    #$B8         RETURN TO RELATIVE MODE
00172 F0C0 BD F169       JSR      SHCONT
00173 F0C3 7E F086       JMP      LOAD5
00174                *
00175 F0C6 F6 F165 LOAD6 LDA B    XSTEP2       HAVE FOUND PAPER EDGE
00176 F0C9 B6 F166       LDA A    XSTEP2+1     STEP BACK SLOWLY
00177 F0CC BD F1B8       JSR      SHDAT1
00178 F0CF 4F            CLR A
00179 F0D0 5F            CLR B
00180 F0D1 BD F1A5       JSR      SHDAT2
00181 F0D4 BD F1B8       JSR      SHREDY       WAIT FOR STEP TO OCCUR
00182                *
00183 F0D7 B6 1801       LDA A    PIAORB       IS PAPER EDGE OVER HEAD
00184 F0DA 49            ROL A                 DETECTOR AGAIN?
00185 F0DB 25 E9         BCS      LOAD6        NO, CONTINUE STEPPING
00186                *
00187 F0DD 4F            CLR A                 YES, RELEASE CLAMP
00188 F0DE B7 1801       STA A    PIAORB
00189 F0E1 5F            CLR B                 & MOVE HEAD TO LOWER WINDOW
00190 F0E2 BD F1B8       JSR      SHDAT1
00191 F0E5 F6 F15C       LDA B    LOWIND
00192 F0E8 B6 F15D       LDA A    LOWIND+1
00193 F0EB BD F1A5       JSR      SHDAT2
00194                *
00195 F0EE 4F            CLR A                 REPEAT MOVE TO INSURE ITS
00196 F0EF 5F            CLR B                 COMPLETION
00197 F0F0 BD F1B8       JSR      SHDAT1
00198 F0F3 F6 F15C       LDA B    LOWIND
00199 F0F6 B6 F15D       LDA A    LOWIND+1
00200 F0F9 BD F1A5       JSR      SHDAT2
00201                *
00203                *
00204 F0FC 7F 0003       CLR      LDCNTR       CLEAR STEP COUNTER
00205 F0FF B6 1801 LOAD7 LDA A    PIAORB       IS PAPER EDGE OVER HEAD
00206 F102 49            ROL A                 DETECTOR AT LOWER-WINDOW?
00207 F103 25 1C         BCS      LOAD8
00208                *
00209 F105 F6 F167       LDA B    XSTEP3       NO, STEP .002 INCH
00210 F108 B6 F168       LDA A    XSTEP3+1
00211 F10B BD F1B8       JSR      SHDAT1
00212 F10E 4F            CLR A
00213 F10F 5F            CLR B
00214 F110 BD F1A5       JSR      SHDAT2
00215 F113 BD F1B8       JSR      SHREDY       & WAIT FOR IT TO OCCUR
00216 F116 7C 0003       INC      LDCNTR       BUMP COUNTER, HAVE OVERFLOW?
00217 F119 26 E4         BNE      LOAD7        NO, CHECK FOR EDGE AGAIN
00218 F11B BD F21B       JSR      EJECT        YES, EJECT PAPER
00219 F11E 7E F002       JMP      LOADA        & TRY TO LOAD AGAIN
00220                *
00221 F121 86 01   LOAD8 LDA A    #$01         CLAMP PAPER TO ACT AS PIVOT
00222 F123 B7 1801       STA A    PIAORB
00223 F126 86 64         LDA A    #100         & WAIT FOR IT TO HAPPEN
00224 F128 BD F23C       JSR      PAUSE
00225                *
00226 F12B 96 03         LDA A    LDCNTR       APPLY FUDGE FACTOR TO
00227 F12D 4A            DEC A                 ACCOUNT FOR DIFFERENCE
00228 F12E 4A            DEC A                 BETWEEN LIGHT & DARK
00229 F12F 5F            CLR B
00230 F130 BD F1B8       JSR      SHDAT1       STRAIGHTEN PAPER
00231 F133 4F            CLR A
00232 F134 5F            CLR B
00233 F135 BD F1A5       JSR      SHDAT2
00234 F138 86 FA         LDA A    #250         & WAIT FOR COMPLETION
00235 F13A BD F23C       JSR      PAUSE
```

```
00236                  *
00237  F13D 4F          CLR  A               RELEASE CLAMP
00238  F13E B7 1801     STA  A   PIAORB
00239  F141 86 64       LDA  A   #100        & WAIT FOR RELEASE
00240  F143 BD F23C     JSR      PAUSE
00241                  *
00242  F146 86 80       LDA  A   #180        SWITCH TO ABSOLUTE MODE
00243  F148 BD F169     JSR      SHCONT
00244  F14B F6 F161     LDA  B   XSET        & DEFINE LOCATION ON PAGE
00245  F14E B6 F162     LDA  A   XSET+1
00246  F151 BD F1A5     JSR      SHDAT2
00247  F154 4F          CLR  A
00248  F155 5F          CLR  B
00249  F156 BD F1A5     JSR      SHDAT2
00250                  *
00251  F159 33   LOAD9  PUL  B               RESTORE (A) & (B)
00252  F15A 32          PUL  A
00253  F15B 39          RTS                  & RETURN
00254                  *
00256                  *
00257                  *     LOAD CONSTANTS
00258                  *
00259                  *
00260  F15C F1F0  LOWIND FDB    -3600        REL Y LOC FOR LOWER WINDOW
00261  F15E 38    STPLIM FCB    *38          LOAD STEP CNTR. LIMIT (-200)
00262  F15F 0E10  UPWIND FDB    3600         Y LOC FOR UPPER WINDOW
00263  F161 131F  XSET   FDB    4895         FINAL LOAD X LOCATION
00264  F163 FFE7  XSTEP1 FDB    -25          LOAD X STEP #1
00265  F165 0001  XSTEP2 FDB    1            LOAD X STEP #2
00266  F167 FFFF  XSTEP3 FDB    -1           LOAD X STEP #3
00267                  *
```

What is claimed is:

1. Recording apparatus comprising
a platen,
a plate mounted so as to be closely spaced above said platen,
means for detecting a change in the optical characteristics along a plurality of paths perpendicular to and above said platen at a plurality of inspection points,
first means for selectively applying force at a point on a first side of said platen in either direction along a line in the X direction to a sheet of material when present on said platen, and
means for selectively inserting a localized obstruction through the space defined between said platen and said plate at a point that is off the line along which the force is applied.

2. Apparatus as set forth in claim 1 wherein
a carriage carrying a stylus holder is mounted on top of said plate,
means are provided for moving said carriage along a Y axis, and
said means for selecting a change in optical characteristics is a photo-responsive device mounted on said carriage.

3. Apparatus as set forth in claim 1 wherein said means for detecting a change in optical characteristics are photo-responsive devices embedded at different points in said platen.

4. Apparatus as set forth in claim 1 wherein second means are provided for applying force at the second side of said platen along a line in the X direction to a sheet of material, when present, said latter means being coupled to the means for applying force on the first side of said platen.

5. Apparatus as set forth in claim 4 wherein a controllable clutch and brake mechanism is coupled between said first and second force applying means.

6. Apparatus as set forth in claim 1 wherein said localized obstruction is on the side of a line joining the inspection points that is opposite to the point where the force is to be applied.

7. Apparatus as set forth in claim 1 wherein said localized obstruction is between a line joining the inspection points and the point where the force is to be applied.

8. Apparatus as set forth in claim 1 wherein the force is applied at a point that is between the point where the localized obstruction is applied and a line joining the inspection points.

* * * * *